J. C. FICKES.
DETACHABLE SHOE FOR TIRES.
APPLICATION FILED SEPT. 16, 1913.

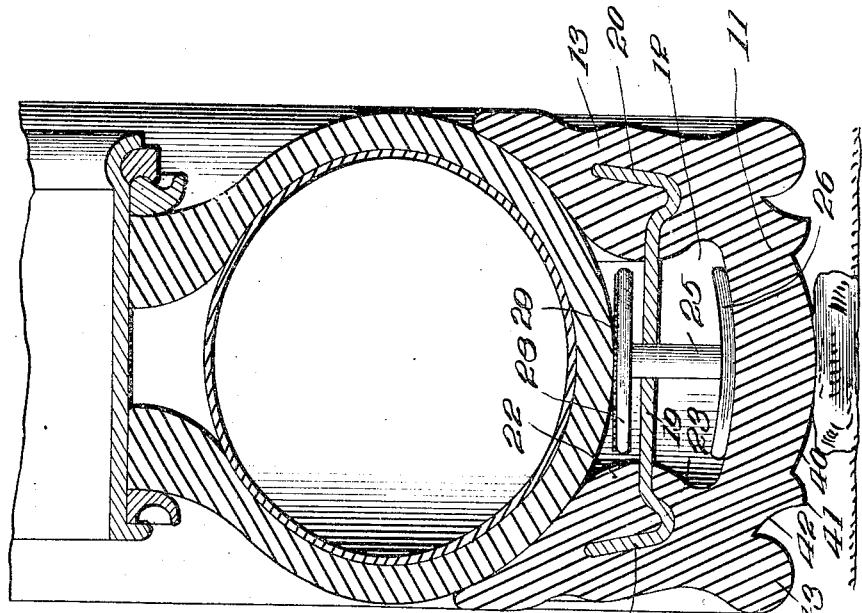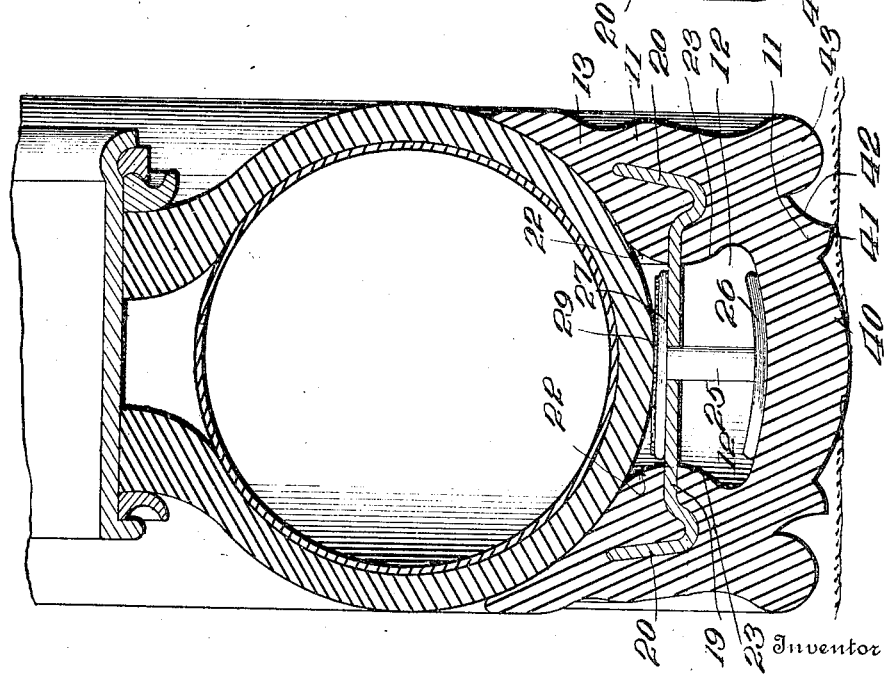

1,122,712.

Patented Dec. 29, 1914.
2 SHEETS—SHEET 2.

UNITED STATES PATENT OFFICE.

JOHN C. FICKES, OF STEUBENVILLE, OHIO.

DETACHABLE SHOE FOR TIRES.

1,122,712.  Specification of Letters Patent.  Patented Dec. 29, 1914.

Application filed September 16, 1913. Serial No. 790,043.

*To all whom it may concern:*

Be it known that I, JOHN C. FICKES, citizen of the United States, residing at Steubenville, in the county of Jefferson and State of Ohio, have invented certain new and useful Improvements in Detachable Shoes for Tires, of which the following is a specification.

This invention relates to an improvement in puncture proof shoes for pneumatic tires.

The primary object of the present invention is to improve the construction shown in my application for patent, filed November 13, 1912, Serial No. 731,112, for an improvement in puncture proof tires. In this application a detachable shoe for pneumatic tires is provided which includes an elastic member which embraces the tire and which is held in place thereon by a plurality of metallic members. The cushioning member is formed with a continuous chamber and supported by one of the metallic members, and disposed within the chamber are plungers actuated by the cushioning member to compress the tire. The present invention is particularly designed to improve the construction of the outer member which constitutes the cushion.

Another object of the present invention is to improve the construction of the metallic member which supports the plungers and which is interposed between the outer cushioning member and the tire.

A further object of the invention is to provide a structure which may be readily positioned on the tire while the same is deflated and which upon the inflation of the tire will be securely held against displacement.

In the drawings: Figure 1 is a transverse section, the plunger being shown in its normal position. Fig. 2 a transverse section showing the rubber shoe in contact with an obstruction, the plunger being reciprocated to compress the tire. Fig. 3 a disassembled perspective view of a portion of the shoe. Fig. 4 a view showing a slightly modified form of means for securing the plunger supporting plate to the shoe, which is particularly adapted for heavy machines in which the weight of the machine has a tendency to spread the shoe.

Corresponding and like parts are referred to in the following description and indicated in all the views of the accompanying drawings by the same reference characters.

In the drawings, 10 designates the tire which may be of any suitable construction.

The shoe consists primarily of a rubber rim 11 formed with the inner channel 12 which constitutes a continuous chamber when assembled on the tire. The side walls 13 of the member 11 are curved interiorly to embrace the tire and are each provided with a groove 14 and immediately above the groove with an annular rib 15. This rib is formed with a projecting edge portion 16 disposed to be inserted within the groove 14, whereby the flat under face 17 of the rib will contact with the edge 18 of the cushioning member adjacent the groove 14 and thus provide a continuous inner wall when the cushioning member is assembled in a manner which will be hereinafter fully described.

An annular ring 19 constitutes the plunger supporting plate, said ring at its edges being formed with curved flanges 20, whereby the ring may be inserted within the cushioning member 11, the grooves 14 accommodating the flanges 20. After the ring has been placed within the cushioning member, the ribs 15 are forced within the channels 21 formed in the flanges 20, the outer curved edges 22 of the ribs alining with the curved wall 23 of the air chamber 24. The plate 19 is provided with a plurality of openings in which are mounted to reciprocate the plungers 25. On the lower terminals of these plungers, that is, their terminals which extend within the chamber 24, are mounted disks 26 which normally contact with the inner wall of the chamber 12. The terminals of the plungers which extend through the member 19 and which are disposed adjacent the tire 10, are provided with disks 27, the contact faces 28 of which are provided with elastic pads 29. With the shoe thus assembled, the same is placed upon the deflated tire 10 and the tire then inflated, expanding and contacting with the shoe to effectually support the shoe against displacement.

The operation of the present device is substantially the same as in applicant's co-pending application, the depression of the shoe forcing the plunger 25 inwardly, its inward movement being cushioned by the tire 10. Particular attention is called to the fact that the present device does not form a permanent part of the wheel, that is, it is detachable in the same sense, as any other form of chain or leather shoe. It is known that tires have been provided with plungers which bear against separable air cushions and the present invention is not directed broadly to the use of plungers disposed to contact with the ground, whereby they are reciprocated and brought into engagement with a pneumatic tire. In the present construction a detachable shoe is provided which may be easily and economically manufactured and in which the metal portions of the shoe while preventing puncture of the tread portion of the tire, do not contact with the tire and are so supported that the shock occasioned by running over an obstruction will not cut either the shoe or the tire. It will also be seen that the molding of the cushioning member may be accomplished in a simple and convenient manner, which is one of the essential features to be considered in the cost of production, the arrangement being such that the annular member may be quickly detached and a new tire substituted in a comparatively short space of time.

In the form shown in Fig. 4, an additional reinforcing means for the annular member 19 is provided. This means consists of the annular plates 30 which are concaved transversely, their convex faces contacting with the concaved outer walls 31 of the cushioning member 11. These plates are secured to the flanges 20 of the annular member 19 by means of securing devices which preferably consist of the hollow threaded barrels 32 formed with heads 33 which contact with the plates, screws 39 extending through the flanges, the heads of said screws being counter-sunk, their threaded portions being received within the barrels. By this construction it will be noted that the annular member 19 is securely held against displacement, its removal, however, being readily effected by raising the ribs 15 and withdrawing the screws 39.

In both forms, the tread portion of the shoe is so mounted as to provide an effectual non-skidding device, being formed with a rounded tread portion 40 which terminates at its edges in ribs 41, there being channels 42 dividing said ribs from the outer rounded ribs 43. It will be seen that all pressure on the member 11 instead of tending to displace the shoe, will act to lock the same more firmly on the tire, the concaved tire engaging portions of the cushioning member riding on the side walls of the casing, whether the thrust be directed at the sides of the shoe or at its tread portion.

The many advantages of a construction of this character will be clearly apparent as it will be noted that the entire construction is such as may be manufactured at a small cost and that it may be conveniently carried on a motor vehicle in the same manner as the usual studded leather armor which is strapped or otherwise secured to the tire and rim.

Particular attention is called to the fact that there is a continuous circulation of air between the shoe and the tire, thus cooling both the tread and tire and prolonging the life of the same. It will also be seen that the metal rim completely encircles the tire thereby rendering the same puncture proof, the arrangement being such that while the rim protects the tire, it is so supported that it will not in any way cut or injure the tire. It will also be seen that the tread portion of the shoe is so constructed as to prevent skidding, the rib 43 acting as a roll or lever to prevent sidewise movement of the wheel.

Having thus described the invention what is claimed as new is:

1. A shoe for tires including an annular member formed of resilient material and disposed to embrace the tread portion of the tire, said annular member being formed on its face adjacent the tire with a channel which constitutes a continuous air chamber, there being grooves formed in the inner faces of the side walls of the chamber, an annular member formed at its edges with flanges disposed within the grooves, and plungers mounted to reciprocate within the chamber and disposed to be brought in contact with the tire when the cushioning member is compressed, said plungers being guided in their movement by the second mentioned annular member.

2. A detachable shoe for tires comprising an annular member formed of elastic material, said member including side portions disposed to embrace the tire, said side portions being interiorly grooved, ribs carried by said side portions adjacent the grooves formed therein, a ring provided at its edges with curved flanges which are received within the grooves formed in said side portions, the ribs being disposed to contact with the flanges when the same are assembled within said grooves, and annular members supported on the outer faces of the side members, said members being secured to the flanges of the ring by securing devices which pass through said side portions.

3. A detachable tire shoe, including an annular elastic rim channeled interiorly to provide a continuous chamber and resultant spaced walls, the free edges of which are curved to conform to a pneumatic tire, the interior faces of the walls being channeled, and an annular metallic member extending transversely of the chamber with its free edges seated in the channels of the walls of the rim, said edges being off-set to provide locking shoulders preventing separating of the walls.

4. A detachable tire shoe, including an annular member formed of elastic material with its inner face shaped to conform to a pneumatic tire, said inner face being channeled circumferentially to provide a continuous medial chamber and resultant side walls, the side walls having their inner faces channeled circumferentially, the channels extending toward the outer faces of the side walls and then curving toward the free edges of the side walls whereby the pressure in a pneumatic tire inclosed in the shoe will force the wall portions defining the channels toward each other, and a metallic plate extending transversely of the main channel of the shoe with its edges extending in the channels of the side walls and directed laterally to seat in the extensions thereof, whereby the pressure of the tire binds the edges of the plate in the channels and the said edges of the plate hold the side walls against spreading.

5. A detachable tire shoe, including an annular member formed of elastic material with its inner face shaped to conform to a pneumatic tire, said inner face being curved circumferentially to provide a continuous central chamber and resultant side walls, the side walls having their inner faces channeled circumferentially, the channels extending toward the outer faces of the side walls and then curving toward the free edges of the side walls, whereby the pressure in a penumatic tire inclosed in the shoe will force the wall portions defining the channels toward each other, a metallic plate extending transversely of the main channel of the shoe with its edges extending in the channels of the side walls and directed laterally to seat in the extensions thereof, whereby the pressure of the tire binds the edges of the plate in the channels and the said edges of the plate hold the side walls against spreading, and plungers reciprocally mounted through the plate, with opposed heads adapted to engage the outer wall of the main channel and a pneumatic tire inclosed in the shoe.

6. A detachable tire shoe, including an annular member formed of elastic material with its inner face shaped to conform to a pneumatic tire, said inner face being channeled circumferentially to provide a continuous central chamber and resultant side walls, the side walls having their inner faces channeled circumferentially, the channels extending toward the free edges of the side walls whereby the pressure in a pneumatic tire inclosed in the shoe will force the wall portions defining the channels toward each other, and a metallic plate extending transversely of the main channel of the shoe with its edges extending in the channels of the side walls and directed laterally to seat in the extensions thereof, whereby the pressure of the tire binds the edges of the plate in the channels and the said edges of the plate hold the side walls against spreading, and additional means for securing the plate in place.

7. A detachable tire shoe, including an annular member formed of elastic material with its inner face shaped to conform to a pneumatic tire, said inner face being curved circumferentially to provide a continuous central chamber and resultant side walls, the side walls having their inner faces channeled circumferentially, the channels extending toward the outer faces of the side walls and then curving toward the free face of the side walls whereby the pressure in a pneumatic tire inclosed in the shoe will force the wall portions defining the channels toward each other, and a metallic plate extending transversely of the main channel of the shoe with its edges extending in the channels of the side walls and directed laterally to seat in the extensions thereof, whereby the pressure of the tire binds the edges of the plate in the channels and the said edges of the plate hold the side walls against spreading, and additional means for securing the plate in place, said means including screws extending outwardly through the laterally directed edge portions of the plate, annular locking rings bearing against the outer faces of the side walls of the shoe, and internally threaded locking bolts passing through said annular rings and portions of the side walls to engage the screws.

8. A detachable tire shoe including an annular elastic member channeled interiorly to provide a continuous chamber and resultant spaced walls, the free edges of the walls being curved to conform to a pneumatic tire, and an element connecting the spaced side walls comprising means located in the chamber to prevent spreading of the walls.

9. A detachable tire shoe including an annular elastic member channeled interiorly to provide a continuous chamber and resultant spaced walls, the free edges of the walls being curved to conform to a pneumatic tire, and an annular metallic member extending transversely of the chamber with its edges supported in the walls and in turn holding such walls against spreading movement.

10. A detachable tire shoe including an annular elastic member channeled interiorly to provide a continuous chamber and resultant spaced walls, the interior faces of the walls being channeled, an annular metallic member extending transversely of the chamber with its free edges seated in the channels of the walls of the rim, said edges being offset to provide locking shoulders preventing separating of the walls, and a plurality of plungers reciprocally mounted through the metallic member.

In testimony whereof I affix my signature in presence of two witnesses.

JOHN C. FICKES. [L. S.]

Witnesses:
  JAY D. PAISLEY,
  HARRY GRIFFITH.